GEORGE W. ROBSON, OF CINCINNATI, OHIO, AND MELVIN T. HUGHES, OF PARIS, KENTUCKY.

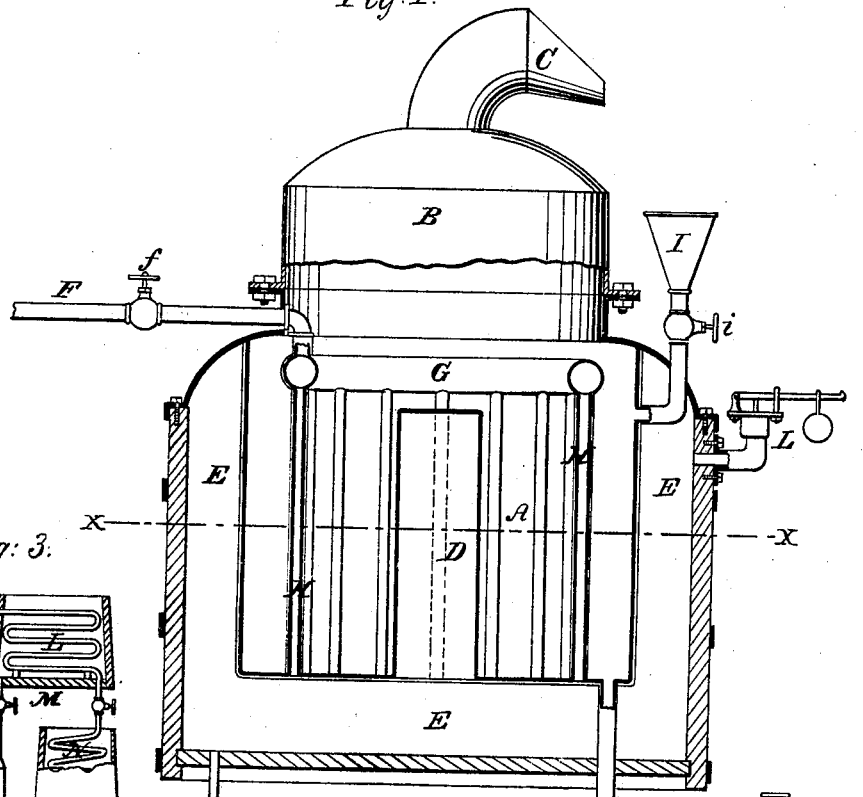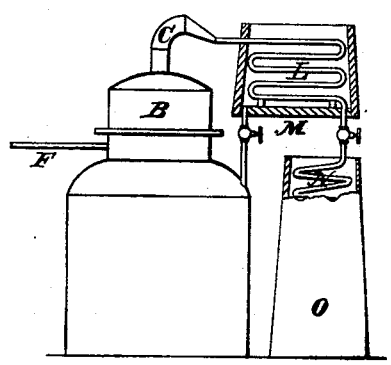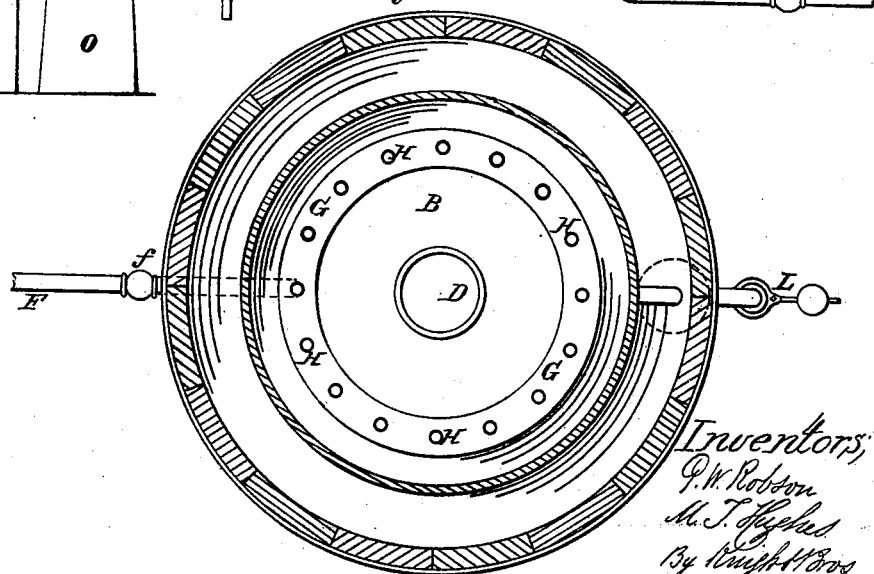

Letters Patent No. 87,971, dated March 16, 1869.

IMPROVEMENT IN STILLS.

The Schedule referred to in these Letters Patent and making part of the same.

*To whom it may concern:*

Be it known that we, GEORGE W. ROBSON, of Cincinnati, Hamilton county, Ohio, and MELVIN T. HUGHES, of Paris, Bourbon county, Kentucky, have invented a new and useful Improvement in Stills; and we hereby declare the following to be a full, clear, and exact description thereof, reference being had to the accompanying drawings, making part of this specification.

Our improvement relates principally to a device for heating the mash, or low-wine in stills, by means of a congeries of steam-pipes within the still proper, or cucurbit, in connection with an enclosing-jacket and internal chamber for said steam, as hereinafter set forth.

Figure 1 is a vertical section of a still provided with our improved heater.

Figure 2 is a horizontal section, at the line X-X, looking upward.

Figure 3 is a diagram exhibiting the heater-worm and connections.

The boiler, or still proper, A, may have the represented cylindrical or any other approved form, and be surmounted with a cylindrical head, B, discharging into the customary goose-neck, C.

The still A is provided, at its axis, with a chamber, D, closed at top, and opening below into a jacket, or case, E, which completely encloses the sides and bottom of the still.

F is a pipe from a steam-boiler, said pipe having a faucet, $f$, and entering the still just above the enclosing-case, and passing into an annular pipe, G, from which descends a series of tubes, H, that open into the lower space of the enclosing-case E.

The still is charged through a funnel, I, having a suitable valve, or faucet, $i$.

J and K are blow-off cocks to the still and jacket, respectively.

L is a safety-valve for the jacket.

It will be seen that the liquor in the still is subjected to a very extensive contact with steam-heated surfaces, and that radiation of heat is prevented by its enclosure in the jacket E, which receives the partly-spent steam from the tubes. It is also apparent that it is impossible to burn the mash with this apparatus.

The water of condensation, which accumulates in the bottom of the jacket, may be discharged, from time to time, through the faucet K.

Connected with the goose-neck C is the worm-pipe L, which passes through the tank M, containing low-wine, and from the said tank the worm L passes to the usual flake-stand worm, N O.

The objects of this arrangement are to heat the low-wine for redistillation, and cause a partial condensation of the steam within the worm L.

We claim herein as new, and of our invention—

1. The described arrangement of pipes F and G, tubes H, and jacket E, either with or without the chamber D, for the purpose set forth.

2. In combination with the elements D E F G H, the heater-worm L and tank M, as and for the purposes set forth.

In testimony of which invention, we hereunto set our hands.

GEORGE W. ROBSON.
MELVIN T. HUGHES.

Witnesses:
WILLIAM F. HANSELMANN,
S. F. BLACK.